Figure 1:
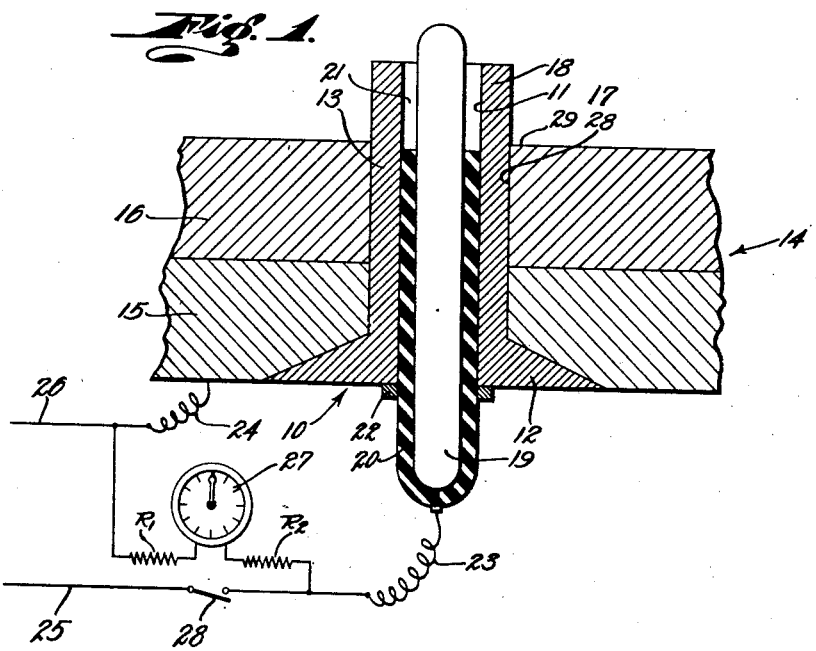

Aug. 25, 1942.   D. W. FETHER   2,293,894
METHOD AND APPARATUS FOR SETTING RIVETS
Filed April 12, 1941

Inventor
DONALD W. FETHER
H. Calvin White
Attorney

Patented Aug. 25, 1942

2,293,894

UNITED STATES PATENT OFFICE 2,293,894

METHOD AND APPARATUS FOR SETTING RIVETS

Donald W. Fether, Downey, Calif.

Application April 12, 1941, Serial No. 388,247

9 Claims. (Cl. 219—10)

This invention relates to an improved system for setting tubular rivets or the like, and is distinguished from customary practices of mechanically or forceably expanding the end portion of the rivet beyond the diameter of the work opening, in that according to the invention such expansion of the rivet is accomplished by melting or fusing its end portion under the influence of an electric arc localized with relation to the rivet, all as later explained. It may further be mentioned preliminarily that the invention is particularly adapted to situations where "blind" riveting is to be employed (i. e. where the end or the rivet to be expanded is not directly accessible), and especially where the work may be flexible or unsupported to a degree rendering it undesirable or impracticable to subject the rivets to expansion by mechanical forces or blows that might injure the work or the strength of the riveted connection.

One of my primary objects is to provide an improved system whereby the end of the rivet may be expansively melted or fused by an electric arc formed between the rivet and an electrode inserted within the bore of the rivet. This electrode may be of any suitable character, and may consist typically of a high melting point conductor adapted to be inserted in the rivet and electrically insulated from a portion of the rivet length, but leaving an annular air space between the electrode and the end portion of the rivet to be melted. The work to be riveted, e. g. sheet aluminum and alloys, ordinarily being electrically conductive, an arc-producing potential may be applied to the described electrode and to the work, or in effect to the rivet itself. Thus the potential across the annular air space between the electrode and rivet creates an arc of such temperature as to fuse the end of the rivet and cause the melt to spread so that upon cooling, it forms an effective head or enlargement beyond the diameter of the work opening through which the rivet is inserted.

By proper determination of time factors depending upon the size and composition of the rivet, the potential to be applied, and therefore the intensity of the arc, it is possible to fuse the rivet quickly and to secure uniform consistency and spreading of the melt. The rivet setting operation involves simply the insertion of the electrode in the rivet and maintenance of the current flow and arc, for the few seconds required for the rivet end to reach its fusing temperature. And as previously observed, the operation is further characterized by the absence of any disruptive forces on either the work, rivet or the joint itself.

Figure 2:
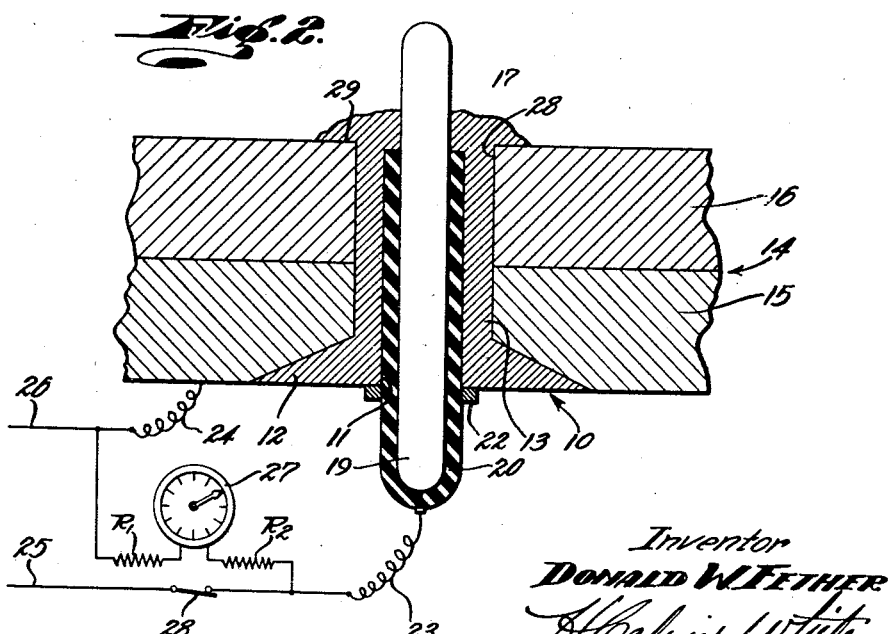

A more complete understanding of the invention and the various features and objects referred to in the foregoing, will be had from the following detailed description of a preferred method and apparatus for carrying out the invention. In the description reference is had to the accompanying drawing, in which:

Fig. 1 is a sectional and diagrammatic view showing the conventionally illustrated electrode inserted within the rivet bore; and Fig. 2 is a similar view showing the form and condition of the fused end of the rivet after being melted.

The rivet generally indicated at 10 may be of any suitable form containing a bore 11 extending through the head 12 and the full length of the stem 13. Typically, the head 12 of the rivet is shown to be countersunk within the work 14 which may consist, for example, of thicknesses or sheets 15 and 16 of electrically conductive material such as aluminum or other metals, and their alloys. As previously indicated, "blind" riveting operations are necessitated in situations where the space 17 at the inner end of the rivet is inaccessible for expansively working the projecting end 18 of the rivet, thereby requiring a type of operation whereby the rivet can be expanded by working through its bore 11.

An elongated electrode 19 made of high melting point steel or other suitable electrically conductive material, is insulated throughout a portion of its length by a layer 20 of suitable electrical insulating material, the outside diameter of which corresponds closely to the diameter of the rivet bore 11 so that the layer 20 serves both to insulate and accurately center the electrode within the rivet. Beyond the insulation 20, the electrode is spaced at 21 from the end portion 18 of the rivet to form an annular air gap across which the current is arced upon application of potential to the electrode and rivet, as will presently appear. Proper positioning of the electrode 19 longitudinally within the rivet bore may be predetermined by providing on the electrode a suitable stop, such as flange 22 applied to the insulation 20, and engageable with the head of the rivet, as illustrated.

The electrode and work may have suitable connections, diagrammatically indicated at 23 and 24 which leads 25 and 26 carrying current from a suitable generator or other source, of such voltage and amperage characteristics as to create an arc across the annular gap 21 between the rivet and electrode. Suitable provision may be made for timing the duration of the arc and the period throughout which the rivet is subjected to the arc temperatures, as by connecting between leads 25 and 26 and resistances $R_1$ and $R_2$ an electrically operated time indicator 27.

Upon closing the switch 28 the potential across the annular gap 21 creates an arc of such heat intensity as to fuse within a few seconds the end portion 18 of the rivet, causing the melt to form and expand as shown in Fig. 2 beyond the diameter of the work opening 26, and to bond to the adjacent surfaces 29 of the inner thickness 10 of the work. As shown, the insulation layer 20 on the electrode may serve the purpose of limiting the flow of the melt into the bore of the remaining portion of the rivet. Upon completion of the melt formation, the electrode may be withdrawn from the rivet either before or after interrupting the current. If it is then found desirable to interiorly support or reinforce the rivet, a pin or plug may be inserted or driven into the rivet bore 11. It may be found desirable to insert within the bore a cylindric pin whose diameter corresponds substantially to the diameter of the rivet bore when the rivet is heated as described, in order that upon cooling, the rivet will shrink about, and to that extent become integrated with the filler pin.

I claim:

1. The method of setting a tubular metallic rivet or the like having an inner portion inserted through an opening in the work, that includes inserting an electrode within and in spaced relation to the rivet bore wall, and melting said inner portion of the rivet to a free-flowing state spreading beyond the diameter of the work opening, by creating an electric arc between the spaced portions of said electrode and the rivet.

2. The method of setting a tubular metallic rivet or the like having an inner portion inserted through an opening in the work, that includes inserting an electrode within the rivet bore wall, spacing and electrically insulating the electrode from the bore wall, and melting said inner portion of the rivet to a free-flowing state spreading beyond the diameter of the work opening, by creating an electric arc between the spaced portions of said electrode and the rivet.

3. The method of setting a tubular metallic rivet having an end portion projecting out of an opening in the work, that includes inserting an electrode within the rivet bore through its opposite end, spacing said electrode from the rivet bore wall, and heating the projecting end portion of the rivet to a degree at which the metal flows beyond the diameter of the work opening without application of pressure to the metal, by creating an electric arc between the spaced portions of said electrode and said end portion of the rivet.

4. The method of setting a tubular metallic rivet having an inner end portion projecting out of an opening in the work that includes inserting an electrode within the rivet bore through its outer end, spacing and electrically insulating the electrode from the inner portion of the bore wall, and melting the projecting end portion of the rivet to a free-flowing state spreading beyond the diameter of the work opening and flowing against the electrode, by creating an electric arc between the spaced portions of said electrode and said end portion of the rivet.

5. The method of setting a tubular metallic rivet or the like contained within an opening in electrically conductive work, the inner side of which is inaccessible for enlarging the rivet except through the rivet bore, that includes inserting an electrode into the rivet through its outer end and maintaining the electrode in spaced relation to the inner end portion of the rivet bore wall, and applying to the work and electrode an electrical potential creating an arc between the spaced portions of the electrode and the rivet which causes the inner end portion of the rivet to melt to a free-flowing state spreading outwardly beyond the diameter of the work opening.

6. The method of setting a tubular metallic rivet or the like contained within an opening in electrically conductive work, the inner side of which is inaccessible for enlarging the rivet except through the rivet bore, that includes inserting an electrode into the rivet through its outer end and maintaining the electrode in spaced relation to the inner end portion of the rivet bore wall, and applying to the work and electrode an electrical potential creating an arc between the spaced portions of the electrode and the rivet which causes the inner end portion of the rivet to melt to a free-flowing state spreading outwardly beyond the diameter of the work opening and flowing inwardly against the electrode.

7. Apparatus for electrically enlarging a metallic tubular rivet or the like contained within an opening in the work, said apparatus comprising a metallic elongated electrode adapted to be inserted within the rivet bore from its outer end, means for applying to said electrode and rivet an electrical potential, means carried by and at the outside of a portion of said electrode for maintaining said portion electrically insulated from the rivet bore wall so that said potential creates an arc between another part of the electrode and rivet to cause a portion of the rivet to melt to a free-flowing state spreading outwardly beyond the diameter of the work opening, and means carried by the electrode and engageable with the outer end of the rivet to predetermine the distance the electrode is insertable within the rivet.

8. Apparatus for electrically enlarging a metallic tubular rivet or the like contained within an opening in the work, said apparatus comprising a metallic elongated electrode adapted to be inserted within the rivet bore from its outer end, means for applying to said electrode and rivet an electrical potential, electrical insulation covering the outer end and an adjacent portion of the electrode to be received in the rivet bore, said insulation supporting the electrode in spaced relation to the rivet bore wall so that said potential creates an arc between the rivet and an uninsulated portion of the electrode to cause a portion of the rivet to melt to a free-flowing state spreading outwardly beyond the diameter of the work opening, and means carried by the electrode and engageable with the outer end of the rivet to predetermine the distance the electrode is insertable within the rivet.

9. Apparatus for electrically enlarging a metallic tubular rivet or the like contained within and having its inner end projecting out of an opening in the work, said apparatus comprising an electrode adapted to be inserted within substantially the full length of the rivet bore, electrical insulation between the electrode and said bore wall and covering the bore-received portion of the electrode except an inner end portion thereof so that an annular air space is provided between the electrode and the end portion of the rivet, means for applying to said electrode and rivet an electrical potential for creating an arc between the electrode and rivet across said space to melt said end portion of the rivet to form a free-flowing mass, and a shoulder on said insulation and engageable with the outer end of the rivet to predetermine the distance the electrode is insertable within the rivet.

DONALD W. FETHER.